US 9,489,789 B2

(12) United States Patent
Kawamura et al.

(10) Patent No.: US 9,489,789 B2
(45) Date of Patent: Nov. 8, 2016

(54) ELECTRONIC KEY REGISTRATION METHOD AND ELECTRONIC KEY REGISTRATION SYSTEM (71) Applicant: KABUSHIKI KAISHA TOKAI RIKA DENKI SEISAKUSHO, Aichi (JP)

(72) Inventors: Daisuke Kawamura, Aichi (JP); Hiroaki Iwashita, Aichi (JP); Masaki Hayashi, Aichi (JP); Masaki Oshima, Aichi (JP); Tetsuya Egawa, Aichi (JP); Kazunori Arakawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 232 days.

(21) Appl. No.: 14/174,318

(22) Filed: Feb. 6, 2014

(65) Prior Publication Data
US 2014/0232521 A1 Aug. 21, 2014

(30) Foreign Application Priority Data

Feb. 15, 2013 (JP) ................................. 2013-027713

(51) Int. Cl.
G07C 9/00 (2006.01)
B60R 25/24 (2013.01)

(52) U.S. Cl.
CPC ........... *G07C 9/00896* (2013.01); *B60R 25/24* (2013.01); *G07C 9/00007* (2013.01); *G07C 9/00309* (2013.01); *G07C 9/00817* (2013.01)

(58) Field of Classification Search
None
See application file for complete search history.

(56) References Cited

U.S. PATENT DOCUMENTS

| | | | |
|---|---|---|---|
| 5,838,251 A | 11/1998 | Brinkmeyer et al. | |
| 6,501,369 B1 | 12/2002 | Treharne | |
| 7,245,210 B2 * | 7/2007 | Konno | B60R 25/04 307/10.2 |
| 9,094,382 B2 * | 7/2015 | Kawamura | H04L 9/0869 |
| 9,137,658 B2 * | 9/2015 | Kawamura | G07C 9/00174 |
| 9,330,510 B2 * | 5/2016 | Kawamura | G07C 9/00007 |
| 2005/0179518 A1 | 8/2005 | Kawamura et al. | |
| 2008/0255721 A1 * | 10/2008 | Yamada | G07C 5/008 701/31.4 |
| 2009/0267733 A1 | 10/2009 | Teramura et al. | |
| 2010/0220857 A1 * | 9/2010 | Kawamura | H04L 9/0844 380/44 |

(Continued)

FOREIGN PATENT DOCUMENTS

| | | |
|---|---|---|
| DE | 102008039090 | 5/2009 |
| EP | 0788946 | 8/1997 |
| EP | 1564690 | 8/2005 |

(Continued)

OTHER PUBLICATIONS

JP 2013234521A (Kawamura et al.); Nov. 21, 2013; Partial English machine translation; 23 pages.*

(Continued)

*Primary Examiner* — Brian Miller
(74) *Attorney, Agent, or Firm* — Greenblum & Bernstein, P.L.C.

(57) ABSTRACT

A method for registering an electronic key includes storing an electronic key ID and an encryption code in a controller to register the electronic key to the controller, and associating a communication subject ID, which is unique to a communication subject, with a controller ID, which is unique to the controller storing the electronic key ID and the encryption code, and the electronic key ID.

11 Claims, 9 Drawing Sheets

(56) References Cited

U.S. PATENT DOCUMENTS

| | | | |
|---|---|---|---|
| 2013/0285792 A1 | 10/2013 | Shimizu et al. | |
| 2013/0301834 A1* | 11/2013 | Kawamura | H04W 12/04 380/270 |
| 2014/0098958 A1 | 4/2014 | Kawamura et al. | |
| 2014/0098959 A1 | 4/2014 | Kawamura et al. | |
| 2014/0232520 A1* | 8/2014 | Kawamura | G07C 9/00007 340/5.23 |
| 2014/0232521 A1* | 8/2014 | Kawamura | B60R 25/24 340/5.26 |

FOREIGN PATENT DOCUMENTS

| | | | |
|---|---|---|---|
| JP | 07-061328 | 3/1995 | |
| JP | 2003-148018 | 5/2003 | |
| JP | 2004-107959 | 4/2004 | |
| JP | 2012-36659 | 2/2012 | |
| JP | 2013234521 A * | 11/2013 | B60R 25/01 |

OTHER PUBLICATIONS

U.S. Appl. No. 14/175,013 to Daisuke Kawamura et al., filed Feb. 7, 2014.

Extended European Search Report, dated Jun. 5, 2014, in corresponding EP Patent Application No. 14154788.5.

Office Action in Japan Patent Application No. 2013-27713, mail date is May 31, 2016, together with an English language translation thereof.

* cited by examiner

Fig.1

Fig.2A Factory Registration

Fig.2B Online Registration

Fig.2C Offline Registration

ELECTRONIC KEY REGISTRATION METHOD AND ELECTRONIC KEY REGISTRATION SYSTEM

CROSS-REFERENCE TO RELATED APPLICATIONS

This application is based upon and claims the benefit of priority from prior Japanese Patent Application No. 2013-027713, filed on Feb. 15, 2013, the entire contents of which are incorporated herein by reference.

FIELD

The present invention relates to a method and a system for registering an electronic key to a communication subject (e.g., vehicle).

BACKGROUND

Vehicles often include an electronic key system that verifies an electronic key with an electronic key ID transmitted through wireless communication from the electronic key. In such an electronic key system, the electronic key needs to be registered to the vehicle. Thus, the electronic key or an encryption code is registered in advance to a controller such as an electronic control unit that manages the operation of the electronic key system in the vehicle. Japanese Laid-Open Patent Publication Nos. 7-61328, 2003-148018, and 2004-107959 each describe an example of an electronic key registration system.

SUMMARY

The electronic key system needs to be provided with a high level of security to prevent the registration of an unauthorized electronic key to the controller.

One aspect of the present invention is a method for registering an electronic key to a controller of a communication subject (e.g., vehicle). The electronic key includes a unique electronic key ID and an encryption code associated with the electronic key ID and used for encrypted communication between the electronic key and the controller. The method includes storing the electronic key ID and the encryption code in the controller to register the electronic key to the controller, and associating a communication subject ID (e.g., vehicle ID), which is unique to the communication subject (e.g., vehicle), with a controller ID, which is unique to the controller storing the electronic key ID and the encryption code, and the electronic key ID.

A further aspect of the present invention is an electronic key registration system including a controller arranged in a communication subject (e.g., vehicle). An electronic key includes a first memory that stores a unique electronic key ID and an encryption code. The encryption code is associated with the electronic key ID and used for encrypted communication between the electronic key and the controller. A management center transmits and receives information to and from the controller. The controller includes a second memory. The controller is configured to register the electronic key by storing the electronic key ID and the encryption code in the second memory. The management center includes a database. The management center is configured to associate a communication subject ID (e.g., vehicle ID), which is unique to the communication subject (e.g., vehicle), with a controller ID, which is unique to the controller storing the electronic key ID and the encryption code, and the electronic key ID in the database.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

An electronic key registration system 15 will now be discussed with reference to the drawings. An electronic key system 3 will first be described.

[Electronic Key System]

Figure 1:
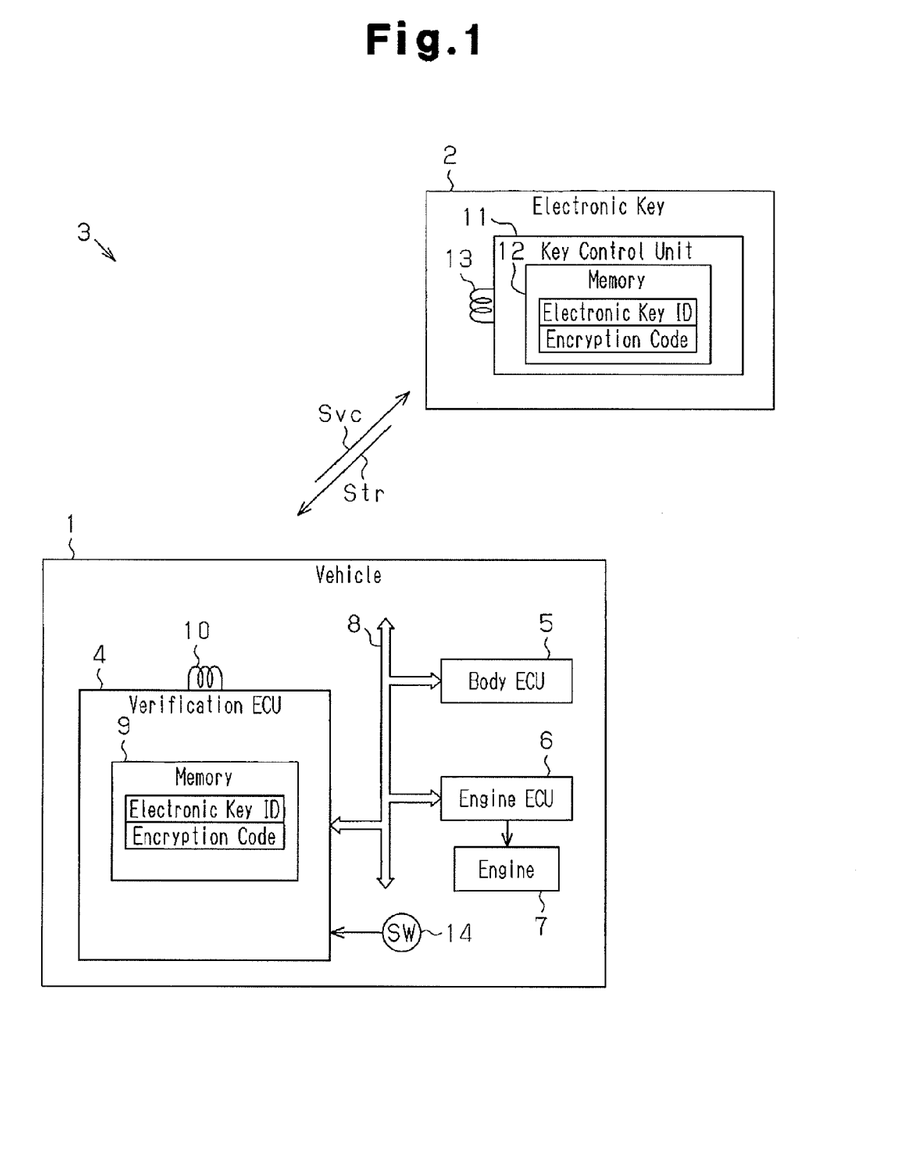
FIG. 1 is a schematic block diagram illustrating one embodiment of an electronic key system.

Referring to FIG. 1, the vehicle 1 includes the electronic key system 3 that verifies an electronic key 2 through wireless communication. The electronic key system 3 is, for example, a radio frequency identification (RFID) system. In the present embodiment, the RFID system is an immobilizer system that performs ID verification (immobilizer verification) on the electronic key 2 through bidirectional near-field wireless communication (communication distance of several centimeters to several tens of centimeters) on a frequency of, for example, approximately 13.56 MHz.

The vehicle 1 includes a verification ECU 4, which verifies the electronic key 2, a body ECU 5, which manages the power supply for electric onboard devices, and an engine ECU 6, which controls the engine 7. A bus 8 connects the ECUs 4 to 6 in the vehicle. The verification ECU 4 includes a memory 9. The memory 9 stores an ID of the electronic key 2 (electronic key ID) and an encryption code. The encryption code is used for encrypted verification performed during ID verification of the electronic key 2, that is, for encrypted communication between the verification ECU 4 and the electronic key 2. In the present embodiment, challenge-response verification is performed as the encrypted verification. The electronic key ID and the encryption code are stored in the memory 9 associated with each other as a set. The number of sets of the electronic key ID and the encryption code stored in the memory 9 conforms to the number of electronic keys registered to the vehicle 1. The verification ECU 4 is connected to a communication antenna 10 that allows for the transmission and reception of radio waves on a low frequency (LF) band. The verification ECU 4 is one example of a controller.

The electronic key 2 includes a key control unit 11 that manages the operation of the electronic key 2. The key control unit 11 includes a memory 12, which stores the electronic key ID and the encryption code. The key control unit 11 is connected to a communication antenna 13 that allows for the transmission and reception of LF radio waves.

When a driver enters the vehicle, the verification ECU 4 transmits drive radio waves Svc from the communication antenna 10. The drive radio waves Svc includes non-modulated waves, which is used as power (drive power) for the electronic key 2, and a challenge code, which is used for the challenge-response verification. The challenge code is changed whenever verification is performed. The electronic key 2 is activated by the drive radio waves Svc received by the communication antenna 13 and returns a transponder signal Str to the verification ECU 4. The transponder signal Str includes the electronic key ID, which is registered to the electronic key 2, and a response code. The response code is generated from the challenge code, which is received from the vehicle 1, and the encryption code, which is stored in the memory 12.

The verification ECU 4 also generates a response code from the encryption code stored in the memory 9 and the challenge code. Then, the verification ECU 4 obtains the response code from the transponder signal Str received by the communication antenna 10 to perform challenge-response verification by comparing the received response code with the generated response code. Further, the verification ECU 4 obtains the electronic key ID from the transponder signal Str and performs ID verification by comparing the electronic key ID with the electronic key ID stored in the memory 9. When challenge-response verification and ID verification are accomplished, the verification ECU 4 determines that immobilizer verification has been accomplished and permits power shifting operations and engine starting operations to be performed with the engine switch 14.

[Electronic Key Registration System]

Figure 2A:
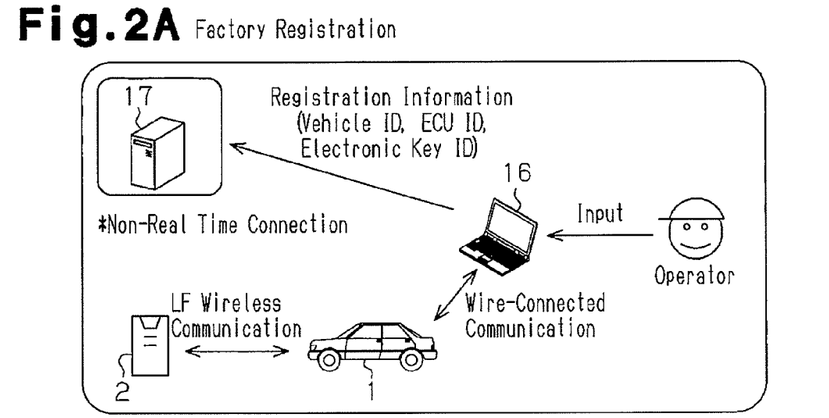
FIG. 2A is a diagram illustrating registration of an electronic key with an electronic key registration system in a plant.
Figure 2B:
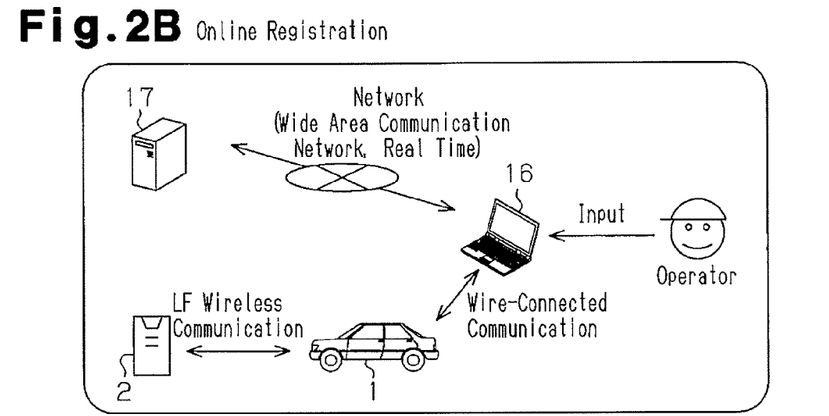
FIG. 2B is a diagram illustrating online registration of an electronic key with the electronic key registration system.
Figure 2C:
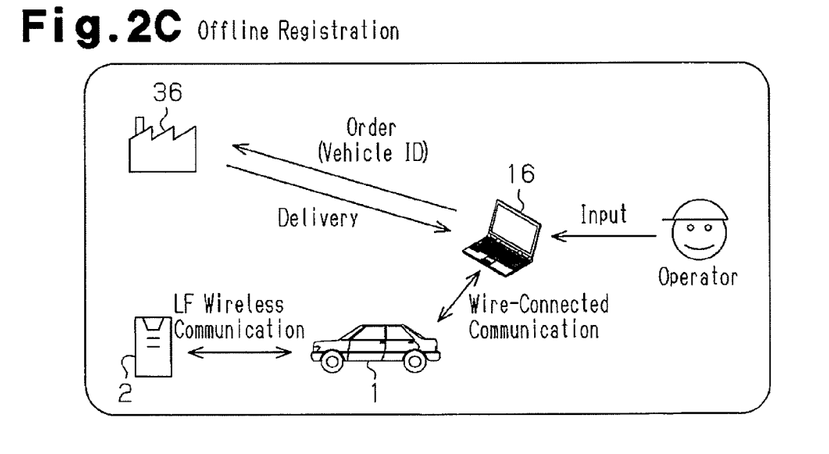
FIG. 2C is a diagram illustrating offline registration of an electronic key with the electronic key registration system.

FIGS. 2A to 2C illustrate the electronic key registration system 15 that registers the electronic key 2 to the vehicle 1. In the present example, the electronic key registration system 15 includes the vehicle 1 (verification ECU 4), the electronic key 2, a registration tool 16, and a management center 17. The registration process of the electronic key 2 (hereafter also referred to as key registration) is classified into factory registration serving as area-limited registration (refer to FIG. 2A), online registration (refer to FIG. 2B), and offline registration (refer to FIG. 2C). Factory registration is performed when initially registering the electronic key 2 to the vehicle 1 in a factory. Online registration is performed when registering the electronic key 2 to the vehicle 1 by accessing a network. Offline registration is performed when registering the electronic key 2 to the vehicle 1 without accessing a network.

Figure 3:
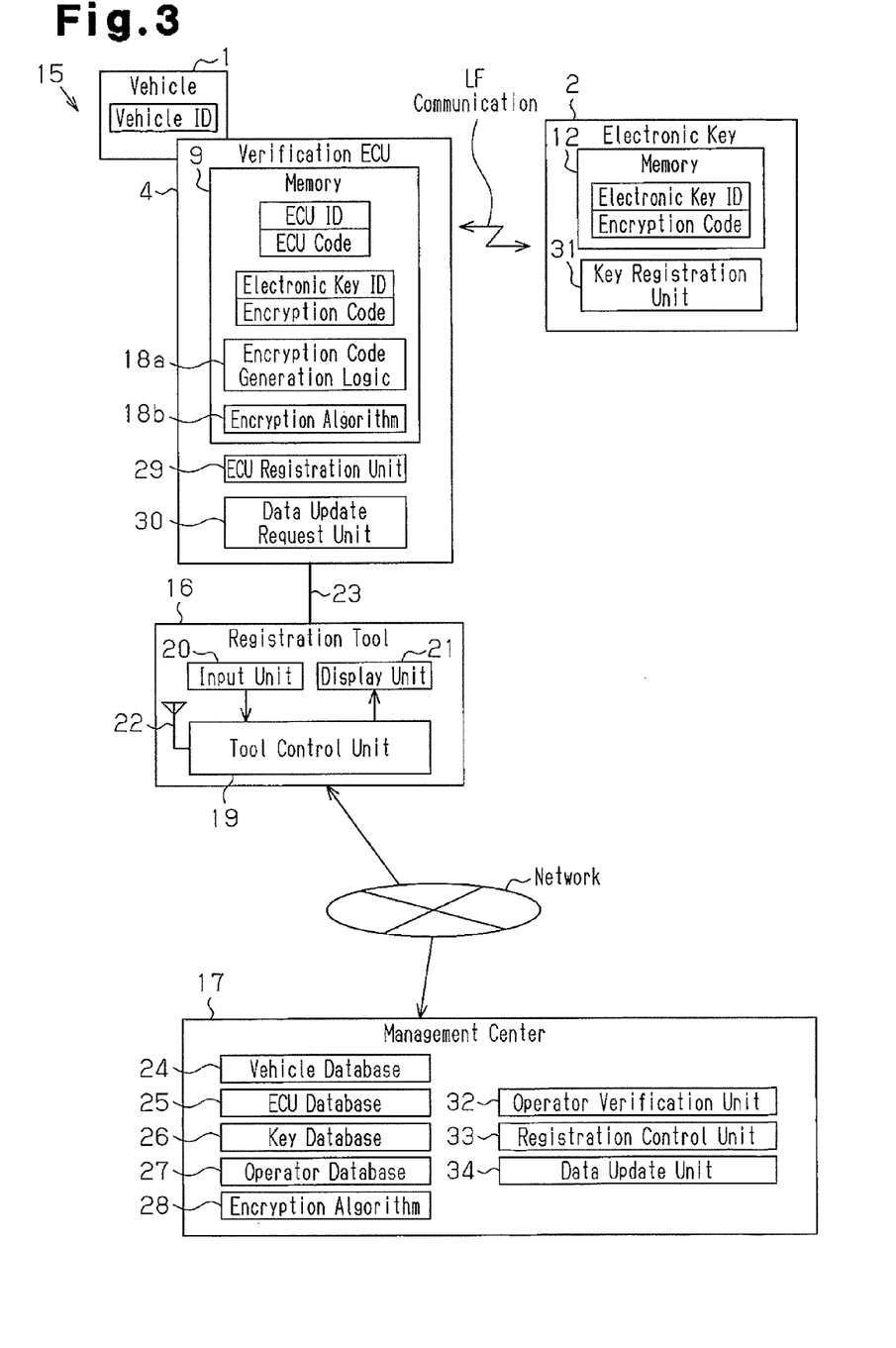
FIG. 3 is a schematic block diagram of the electronic key registration system.

As illustrated in FIG. 3, the memory 9 of the verification ECU 4 stores an ECU ID, which is unique to the verification ECU 4, and an ECU code, which associates the verification ECU 4 with the management center 17. Further, the memory 9 stores an encryption code generation logic 18a and an encryption algorithm 18b. The encryption code generation logic 18a is used to compute the encryption code during factory registration. The encryption algorithm 18b is used to compute the encryption code during online registration and offline registration. The Advanced Encryption Standard (AES), for example, is used for the encryption algorithm 18b. The verification ECU 4 performs key registration through LF band bidirectional near-field wireless communication, which is used for immobilizer verification. The ECU ID is one example of a controller ID. The ECU code is one example of a controller code. The encryption code generation logic 18a is one example of an encryption code computation equation.

A vehicle ID, which is unique to the vehicle 1, is registered to the vehicle 1. The vehicle ID is, for example, an identification number that is marked on the vehicle body or the like. The vehicle ID is one example of a communication subject ID.

The registration tool 16 includes a tool control unit 19 that controls the operation of the registration tool 16, an input unit 20 such as a keyboard, a display unit 21 that displays various types of images, and a network communication antenna 22. The registration tool 16 performs wire-connected communication with the vehicle 1 through, for example, a cable 23. The registration tool 16 communicates with the management center 17 through the network communication antenna 22. The Internet, for example, is used for the network communication. The registration tool 16 is operated by an operator.

The management center 17 includes a vehicle database 24, an ECU database 25, a key database 26, and an operator database 27. Although not illustrated, the management center 17 includes a computer or processor, for example, a server, that controls the processing performed in the management center 17. The vehicle ID, the ECU ID, the electronic key ID, and the operator ID are stored in the vehicle database 24 associated with one another. The ECU ID and the ECU code are stored in the ECU database 25 associated with each other. The electronic key ID and the encryption code are stored in the key database 26 associated with each other. An operator ID, which is unique to the operator, and a password are stored in the operator database 27 associated with each other. The management center 17 also stores an encryption algorithm 28, which is the same as that stored in the verification ECU 4.

The verification ECU 4 includes an ECU registration unit 29, which controls key registration, and a data update request unit 30, which requests the management center 17 to update the data of the databases 24 to 27. The ECU registration unit 29 controls key registration in accordance with registration commands received from the registration tool 16. The data update request unit 30 transmits a data update request to the management center 17 after key registration is completed.

The electronic key 2 includes a key registration unit 31 that controls key registration. The key registration unit 31 controls the registration of the electronic key 2 to the verification ECU 4 in cooperation with the ECU registration unit 29.

The management center 17 further includes an operator verification unit 32 that verifies the operator during key registration, a registration control unit 33 that controls key registration, and a data update unit 34 that reflects a key registration result to the databases 24 to 27 after key registration is completed. The operator verification unit 32 refers to the operator database 27 to verify the operator using the operator ID input during key registration. The registration control unit 33 computes a SEED code with the encryption algorithm 28 stored in the management center 17. The SEED code is used to generate the encryption code.

The operation of the electronic key registration system 15 will now be described with reference to FIGS. 4 to 10.

Figure 4:
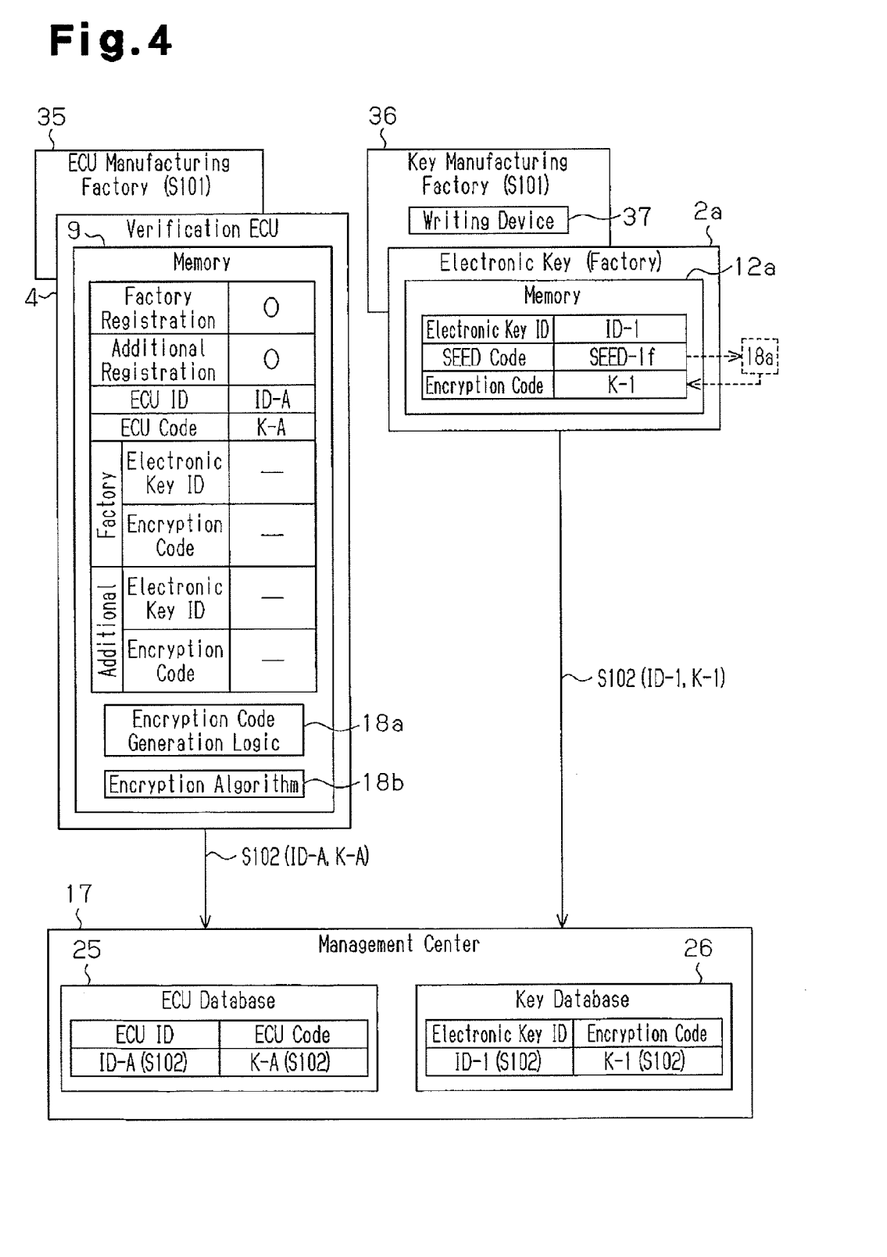
FIG. 4 is a diagram illustrating the manufacturing of an ECU and a factory-registered electronic key.

(I) Factory Registration (I-1) Manufacturing Verification ECU and Factory-Registered Electronic Key in Factory Referring to FIG. 4, when registering an electronic key 2a to the vehicle 1 (verification ECU 4) in a factory (initial registration), that is, when performing factory registration, a factory-registered electronic key 2a is manufactured in a key manufacturing factory 36. Further, the verification ECU 4 is manufactured in an ECU manufacturing factory 35.

In step S101, an ECU ID "ID-A", an ECU code "K-A", the encryption code generation logic 18a, and the encryption algorithm 18b are written to the memory 9 of the verification ECU 4 in the ECU manufacturing factory 35. Further, a factory registration flag, which indicates whether or not factory registration is permitted, and an additional registration flag, which indicates whether or not additional registration is permitted, are set in the memory 9. The factory registration flag and the additional registration flag are set as "acceptable (marked by circle in FIG. 4)" during factory registration.

Further, in step S101, an electronic key ID "ID-1", a SEED code "SEED-1f", and an encryption code "K-1" are written to a memory 12a of the electronic key 2a in the key manufacturing factory 36. A writing device 37, which holds the encryption code generation logic 18a, is provided in the key manufacturing factory 36. The writing device 37 computes the encryption code "K-1" based on the SEED code "SEED-1f" written to the memory 12a, and writes the encryption code "K-1" to the memory 12a. In this manner, the encryption code "K-1" is associated to the SEED code "SEED-1f" by the encryption code generation logic 18a.

In step S102, the ECU ID "ID-A" and the ECU code "K-A", which are written to the verification ECU 4, are associated with each other and reflected to the ECU database 25 of the management center 17. The updating of the ECU ID and the ECU code in the ECU database 25 may be automatically performed through a network or by the operator.

Further, in step S102, the electronic key ID "ID-1" and the encryption code "K-1", which are written to the electronic key 2a, are associated with each other and reflected to the key database 26 of the management center 17. The updating of the electronic key ID and the encryption code in the key database 26 may be automatically performed through a network or by the operator.

Steps S101 and S102 are repeated whenever the verification ECU 4 is manufactured and the factory-registered electronic key 2a is manufactured. Accordingly, the number of the sets of the ECU ID and the ECU code stored in the ECU database 25 conforms to the number of the manufactured verification ECUs 4. Further, the number of the sets of the electronic key ID and the encryption code stored in the key database 26 conforms to the number of the manufactured electronic keys 2a.

(I-2) Key Registration in Vehicle Factory

Figure 5:
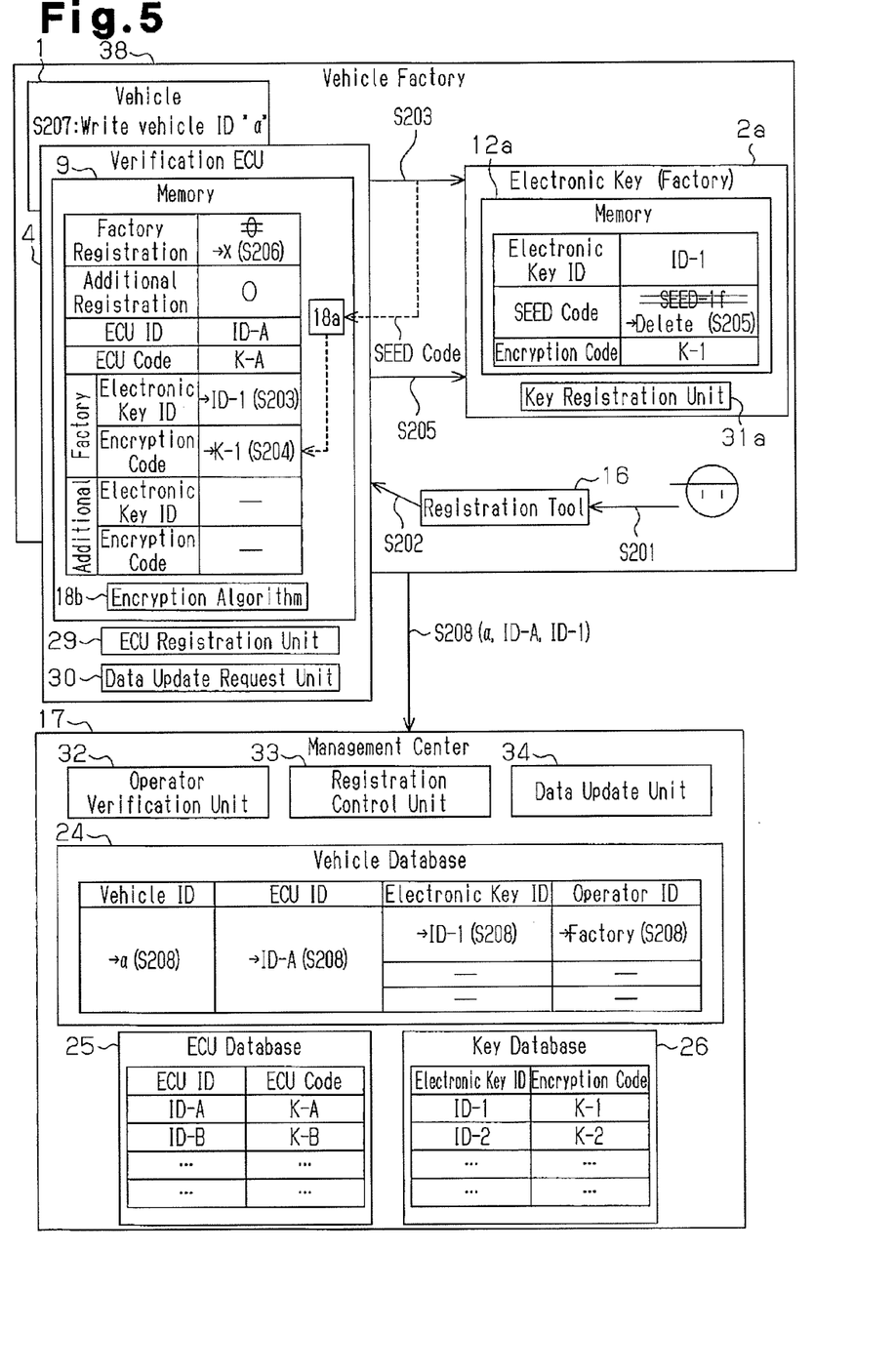
FIG. 5 is a diagram illustrating the registration of the factory-registered electronic key.

Referring to FIG. 5, the initial registration of the electronic key 2a to the vehicle 1 (verification ECU 4), that is, factory registration, is performed in, for example, a vehicle factory 38. The factory registration is performed with a registration tool 16 provided in the vehicle factory 38.

In step S201, the operator inputs a command to the registration tool 16 to start factory registration. In step S202, in accordance with the factory registration start command, the registration tool 16 sends a factory registration command to the verification ECU 4 through wire-connected communication.

In step S203, when the ECU registration unit 29 receives the factory registration command, the ECU registration unit 29 acquires the electronic key ID "ID-1" and a SEED code "SEED-1f" from the electronic key 2a through LF band bidirectional near-field wireless communication. More specifically, the ECU registration unit 29 transmits a key information acquisition request to the electronic key 2a. When the key registration unit 31a receives the key information acquisition request from the verification ECU 4, the key registration unit 31a reads the electronic key ID "ID-1" and the SEED code "SEED-1f" from the memory 12a and transmits the electronic key ID "ID-1" and the SEED code "SEED-1f" to the vehicle 1. The ECU registration unit 29 writes the electronic key ID "ID-1", acquired from the electronic key 2a, to a factory-registered electronic key ID storage region of the memory 9.

In step S204, the ECU registration unit 29 writes the encryption code associated with the electronic key ID "ID-1" to the memory 9. More specifically, the ECU registration unit 29 uses the encryption code generation logic 18a to compute the encryption code "K-1" from the SEED code "SEED-1f" acquired from the electronic key 2a. Then, the ECU registration unit 29 writes the encryption code "K-1" to a factory-registered encryption code storage region of the memory 9.

In step S205, the ECU registration unit 29 transmits a SEED code delete request to the electronic key 2a through LF band bidirectional near-field wireless communication. When the key registration unit 31a receives the SEED code delete request from the verification ECU 4, the key registration unit 31a deletes the SEED code "SEED-1f" from the SEED code storage region of the memory 12a.

Optionally, in step S206, when the ECU registration unit 29 receives a request for deleting a factory registering function from the registration tool 16, the ECU registration unit 29 may switch a factory registration flag from "acceptable (marked by circle in FIG. 5)" to "rejected (marked by cross in FIG. 5)". When the factory registration flag is set to "rejected", the factory registration function is invalidated. In this case, the encryption code generation logic 18a is also deleted from the verification ECU 4. As a result, factory registration is subsequently disabled.

In step S207, the operator registers, for example, a vehicle ID "α" to the vehicle 1. The vehicle ID "α" is marked on the vehicle body or the like of the vehicle 1.

In step S208, the data update request unit 30 transmits registration information to the management center 17 through the registration tool 16 to request the management center 17 to update the data of the vehicle database 24. The registration information includes, for example, the vehicle ID "α", the ECU ID "ID-A", the electronic key ID "ID-1", the operator ID (here, factory ID indicating that factory registration is performed), and the data update request command. In this case, the registration tool 16 does not have to automatically transmit the registration information to the management center 17. For example, the operator may transmit the registration information to the management center 17. Further, the registration information does not have to be transmitted to the management center 17 immediately after registration is completed and may be transmitted when a predetermined time (period) elapses after the registration is completed.

The data update unit 34 writes the vehicle ID "α", the ECU ID "ID-A", the electronic key ID "ID-1", and the operator ID "factory" (factory registration) to the vehicle database 24 in association with the registration information acquired from the registration tool 16.

Steps S201 to S208 (step S206 may be excluded) are repeated whenever an electronic key 2a is registered to the vehicle 1 (verification ECU 4) in the vehicle factory 38. Accordingly, when registering a plurality of electronic keys 2a to the same vehicle (e.g., vehicle ID "α"), a new set of an electronic key ID and task information is associated with the same set of the vehicle ID and the ECU ID stored in the vehicle database 24. Further, when registering an electronic key 2a to another vehicle (e.g., vehicle ID "β"), a set of the vehicle ID, the ECU ID, the electronic key ID, and the task information is added to the vehicle database 24.

(II) Online Registration (Online Additional Registration in Market)

(II-1) Manufacturing of Online-Registered Electronic Key

An electronic key 2b may be registered to the vehicle 1 (verification ECU 4) when network communication is available. In this case, referring to FIG. 6, the online-registered electronic key 2b is manufactured in the key manufacturing factory 36.

Figure 6:
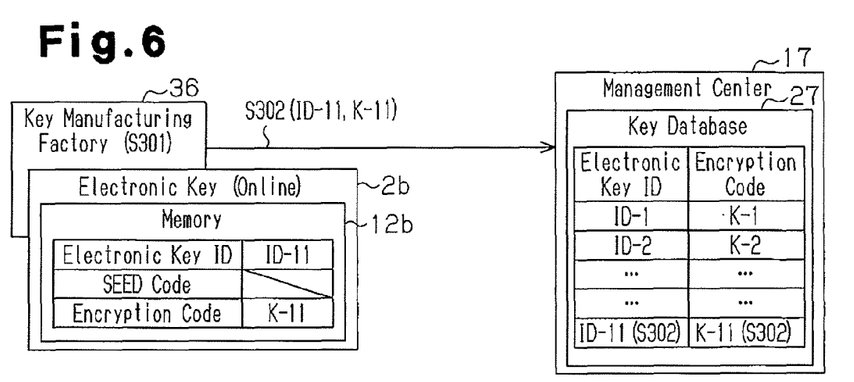
FIG. 6 is a diagram illustrating the manufacturing of an online-registered electronic key.

In step S301, the electronic key 2b is manufactured by writing an electronic key ID "ID-11" and an encryption code "K-11" to a memory 12b of the electronic key 2b in the key manufacturing factory 36. In the case of the online-registered electronic key 2b, the SEED code is not written to the memory 12b, and the SEED code storage region remains blank.

In step S302, the electronic key ID "ID-11" and the encryption code "K-11" written to the electronic key 2b are associated with each other and reflected to the key database 26 of the management center 17. The electronic key ID and encryption code updating of the key database 26 may be automatically performed by a network system or manually performed by an operator.

Steps S301 and S302 are repeated whenever an online-registered electronic key 2b is manufactured. Accordingly, the number of the sets of the electronic key ID and the encryption code stored in the key database 26 conforms to the number of the manufactured electronic keys 2b.

(II-2) Registration of Operator to Management Center

Figure 7:
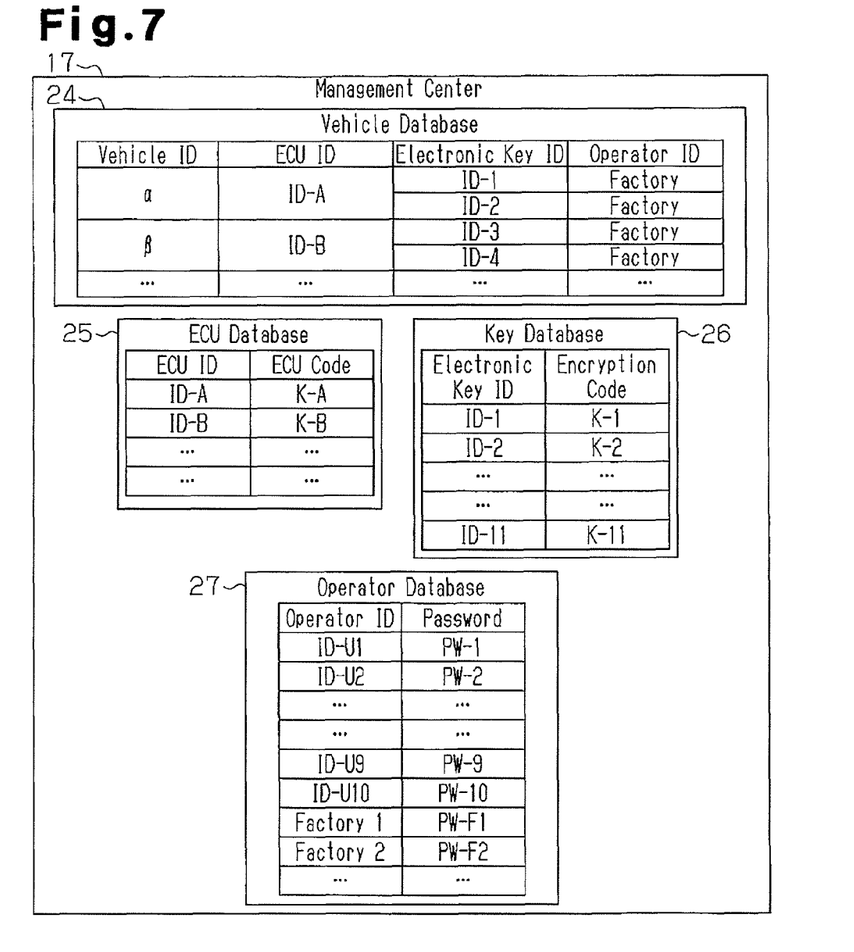
FIG. 7 is a diagram illustrating the registration of an operator to a management center.

Referring to FIG. 7, the registration of the operator to the management center 17 is then performed. When the management center 17 accepts an operator registration application from the operator, the management center 17 generates and assigns an operator ID and a password to the operator. The management center 17 reflects the operator ID and the password assigned to the operator in the operator database 27. An operator ID is assigned not only to each operator but also to each factory.

(II-3) Key Registration in Vehicle Dealer (Online Registration)

Figure 8:
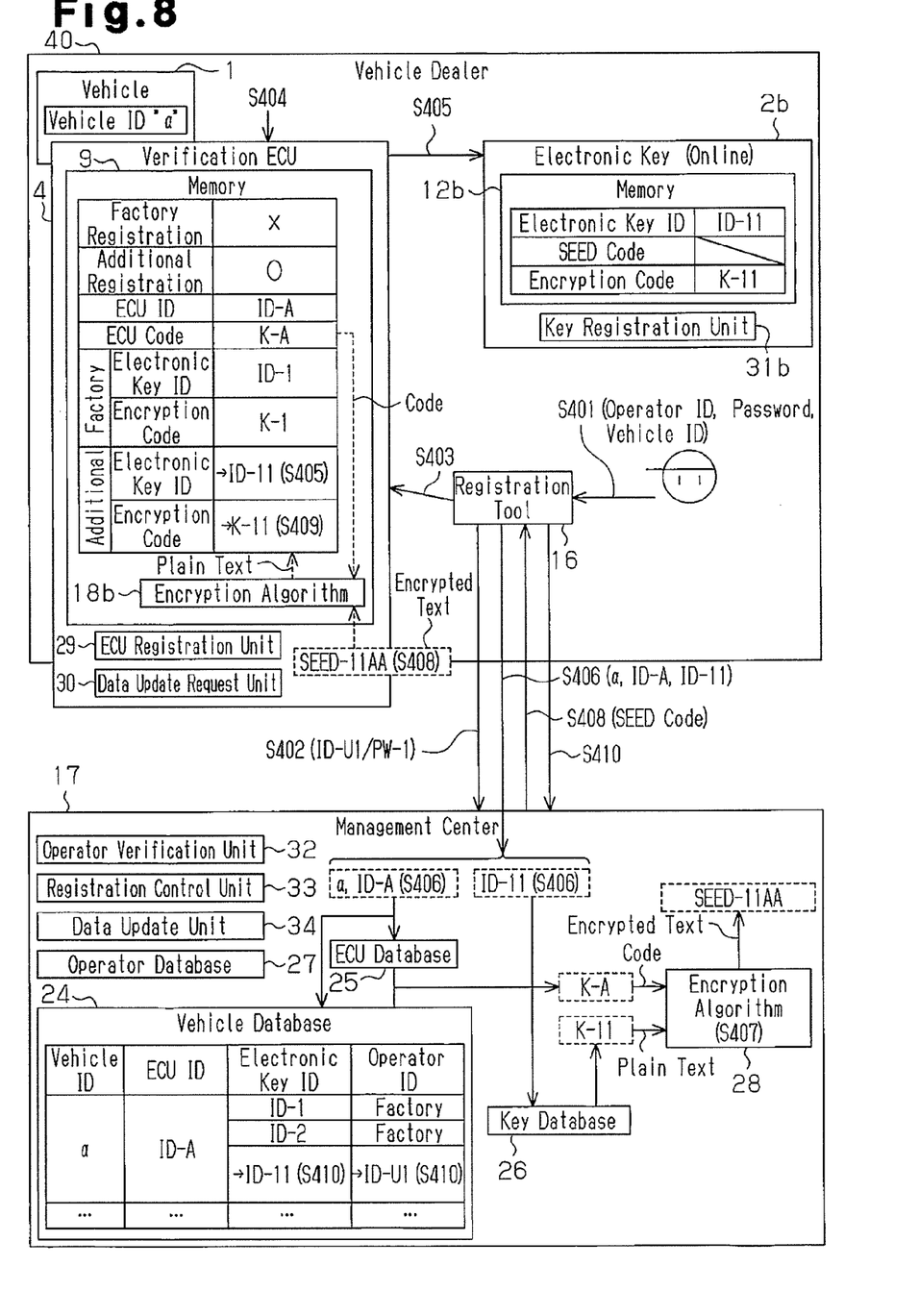
FIG. 8 is a diagram illustrating online registration of the electronic key.

Referring to FIG. 8, the additional registration of the electronic key 2b to the vehicle 1 (verification ECU 4) is performed online in, for example, a vehicle dealer 40. Online registration is performed using, for example, the registration tool 16, which is provided in the vehicle dealer 40.

In step S401, the operator inputs a command to the registration tool 16 to start additional registration. In this case, the operator inputs an operator ID "ID-U1", a password "PW-1", and the vehicle ID "α", which is marked on the vehicle body, to the registration tool 16.

In step S402, the registration tool 16 transmits the operator ID "ID-U1" and the password "PW-1" to the management center 17 through network communication. The operator verification unit 32 verifies the operator when the operator ID "ID-U1" and the password "PW-1" acquired from the registration tool 16 are associated with each other in the operator database 27. Then, when the operator verification unit 32 verifies the operator, the operator verification unit 32 transmits an operator verification accomplishment notification to the registration tool 16 through network communication.

In step S403, the registration tool 16 transmits an additional registration command to the verification ECU 4 through wire-connected communication in response to the operator verification accomplishment notification.

In step S404, the registration tool 16 instructs the ECU registration unit 29 to read registered electronic key IDs. In response, the ECU registration unit 29 checks whether or not a registered electronic key ID (here, electronic key ID "ID-1") is stored in the memory 9. When there is no registered electronic key ID, the additional registration process is forcibly terminated.

When there is a registered electronic key ID, in step S405, the ECU registration unit 29 reads the electronic key ID from the electronic key 2b through LF bidirectional near-field wireless communication. More specifically, the ECU registration unit 29 transmits a key information acquisition request to the electronic key 2b. When the key registration unit 31b receives the key information acquisition request from the verification ECU 4, the key registration unit 31b reads the electronic key ID "ID-11" from the memory 12b and transmits the electronic key ID "ID-11" to the vehicle 1. The ECU registration unit 29 writes the electronic key ID "ID-11", which is acquired from the electronic key 2b, to an additionally registered electronic key ID storage region of the memory 9.

In step S406, the ECU registration unit 29 transmits the electronic key ID "ID-11", together with the ECU ID "ID-A" and the vehicle ID "α", which is input to the registration tool 16 in step S401, from the registration tool 16 to the management center 17 through network communication.

Based on the vehicle ID "α" and the ECU-ID "ID-A", the registration control unit 33 refers to the vehicle database 24 and the ECU database 25 to read the ECU code used for additional registration of the electronic key 2b, that is, the ECU code "K-A" associated with the ECU-ID "ID-A". Further, based on the electronic key ID "ID-11", the registration control unit 33 refers to the key database 26 to read the encryption code used for additional registration of the electronic key 2b, that is, the encryption code "K-11" associated with the electronic key ID "ID-11".

In step S407, the registration control unit 33 generates a SEED code "SEED-11AA" based on the ECU code "K-A", the encryption code "K-11", and the encryption algorithm 28. In this case, the registration control unit 33 inserts the ECU code "K-A" as an encryption code and the encryption code "K-11" as a plain text in the encryption algorithm 28 to compute the SEED code "SEED-11AA" as an encrypted text dedicated for the ECU ID "ID-A".

In step S408, the registration control unit 33 transmits the SEED code "SEED-11AA" to the registration tool 16 through network communication. The SEED code "SEED-11AA" is transmitted from the registration tool 16 to the verification ECU 4.

In step S409, the ECU registration unit 29 generates the encryption code "K-11" related to the electronic key ID "ID-11" based on the ECU code "K-A", which has already been stored in the memory 9, the SEED code "SEED-11AA", and the encryption algorithm 18b. Then, the ECU registration unit 29 writes the encryption code "K-11" to the memory 9. In this case, the ECU registration unit 29 inserts the ECU code "K-A" as an encryption code and the SEED code "SEED-11AA" as an encrypted text in the encryption algorithm 18b to compute the encryption code "K-11" as a plain text. The encryption code "K-11" is written to the additional registration encryption code storage region of the memory 9.

In step S410, the ECU registration unit 29 transmits a registration completion notification from the registration tool 16 to the management center 17 through network communication. When the management center 17 receives the registration completion notification, the management center determines that the encryption code "K-11" has been correctly registered to the verification ECU 4.

Further, in step S410, the data update request unit 30 transmits a data update request from the registration tool 16 to the management center 17 through network communication. The data update unit 34 updates the vehicle database 24 in response to the data update request. In this case, the operator ID "ID-U1", which is acquired in step S402, and the electronic key ID "ID-11", which is acquired in step S406, are written to the vehicle database 24 in association with the vehicle ID "α" and the ECU ID "ID-A".

Steps S401 to S410 are repeated whenever the vehicle dealer 40 registers an online-registered electronic key 2b to the vehicle 1 (verification ECU 4). Accordingly, when registering a plurality of electronic keys 2b to the same vehicle, a new set of an electronic key ID and an operator ID is associated with the same set of the vehicle ID and the ECU ID stored in the vehicle database 24.

(III) Offline Registration (Offline Additional Registration in Market)

(III-1) Manufacturing of Offline-Registered Electronic Key

The additional registration of an electronic key 2c may be performed offline when network communication is not available. In this case, referring to FIG. 9, the offline-registered electronic key 2c is manufactured in the key manufacturing factory 36.

Figure 9:
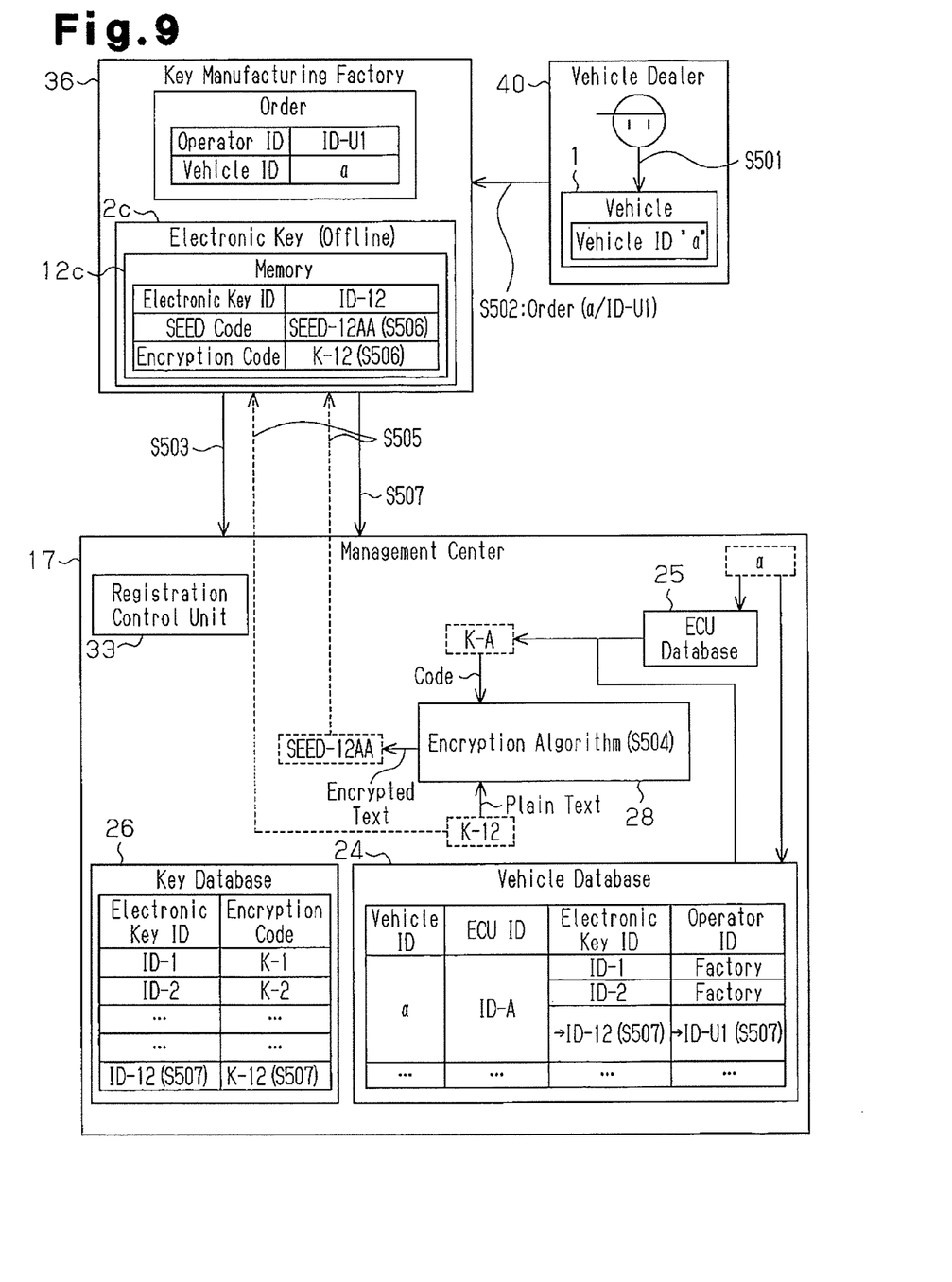
FIG. 9 is a diagram illustrating the manufacturing of an offline-registered electronic key.

In step S501, the operator checks or reads the vehicle ID "α" of the vehicle 1. In step S502, the operator sends an order for the offline-registered electronic key 2c to the key manufacturing factory 36. The order includes the vehicle ID "α" and the operator ID "ID-U1". The order does not have to be a paper document and may be placed through a FAX, telephone, mail, or the like.

In step S503, the key manufacturing factory 36 notifies the management center 17 of the vehicle ID "α" and the operator ID "ID-U1" included in the order. The key manufacturing factory 36 may send the notification of the vehicle ID "α" and the operator ID "ID-U1" to the management center 17 through a FAX, telephone, mail, or the like.

In step S504, the registration control unit 33 computes a SEED code that is registered to the electronic key 2c. More specifically, based on the vehicle ID "α" acquired from the management center 17, the registration control unit 33 refers to the vehicle database 24 and the ECU database 25 to read the ECU code used for additional registration of the electronic key 2c, that is, the ECU code "K-A" associated with the ECU ID "ID-A". Further, the registration control unit 33 generates an encryption code "K-12", which is used to compute the SEED code, and inserts the ECU code "K-A" as an encryption code and an encryption code "K-12" as a plain text in the encryption algorithm 28 to compute a SEED code "SEED-12AA" as an encrypted text dedicated to the ECU ID "ID-A".

In step S505, the registration control unit 33 notifies the key manufacturing factory 36 of the SEED code "SEED-12AA" and the encryption code "K-12". The notification of the SEED code "SEED-12AA" and the encryption code "K-12" may be performed through a FAX, telephone, mail, or the like.

In step S506, the SEED code "SEED-12AA" and the encryption code "K-12", which are acquired from the management center 17, are written to the memory 12c of the electronic key 2c to manufacture the electronic key 2c in the key manufacturing factory 36.

In step S507, the SEED code "SEED-12AA" and the encryption code "K-12", which are written to the electronic key 2c, are associated with each other and reflected to the vehicle database 24 and the key database 26 of the management center 17. More specifically, the key manufacturing factory 36 notifies the management center 17 of the electronic key ID "ID-12" that is written to the electronic key 2c. The data update unit 34 writes the electronic key ID "ID-12" and the operator ID "ID-U1", which is acquired from the key manufacturing factory 36 in step S503, in association with each other to the vehicle database 24. This associates the set of the electronic key ID "ID-12" and the operator ID "ID-U1" with the set of the vehicle ID "α" and the ECU ID "ID-A".

Steps S501 to S507 are repeated whenever an offline-registered electronic key 2c is manufactured. Accordingly, the number of sets of the electronic key ID and the encryption code stored in the key database 26 conforms to the number of the manufactured electronic keys 2c. The key manufacturing factory 36 ships the manufactured electronic key 2c to the vehicle dealer 40 that placed the order.

(III-2) Key Registration (Offline Registration) in Vehicle Dealer

Figure 10:
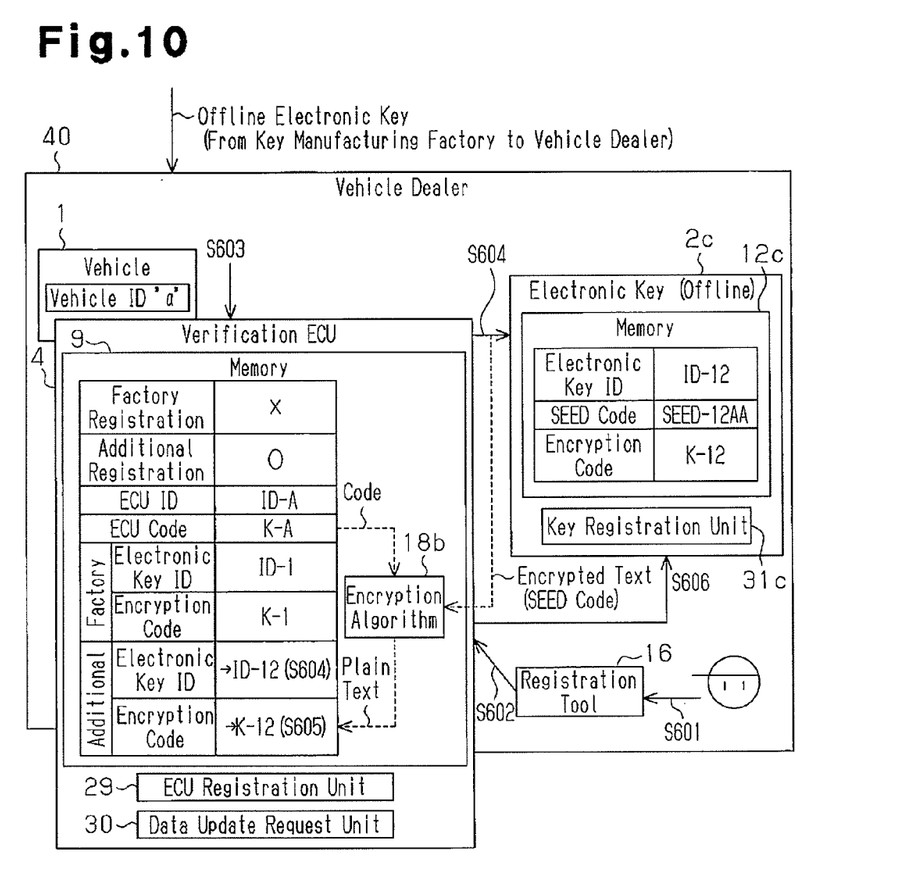
FIG. 10 is a diagram illustrating offline registration of the electronic key.

Referring to FIG. 10, the additional registration of the electronic key 2c to the vehicle 1 (verification ECU 4) is performed, for example, in the vehicle dealer 40 in an offline environment. Since network communication is not available in the offline environment, the registration of the electronic key 2c is performed within the limited area of the vehicle dealer 40. The offline registration is performed using, for example, the registration tool 16 that is provided in the vehicle dealer 40.

In step S601, the operator inputs a command to the registration tool 16 to start additional registration. In step S602, the registration tool 16 sends an additional registration command to the verification ECU 4 through wire-connected communication in response to the additional registration start command.

In step S603, the registration tool 16 instructs the ECU registration unit 29 to read the registered electronic key ID. In response, the ECU registration unit 29 checks whether or not the registered electronic key ID (here, electronic key ID "ID-1") is stored in the memory 9. If there is no registered electronic key ID, the additional registration process is forcibly terminated.

In step S604, the ECU registration unit 29 reads the electronic key ID and the SEED code from the electronic key 2c through LF band bidirectional near-field wireless communication. More specifically, the ECU registration unit 29 transmits a key information acquisition request to the electronic key 2c. When the key registration unit 31c receives the key information acquisition request from the verification ECU 4, the key registration unit 31c reads the electronic key ID "ID-12" and the SEED code "SEED-12AA" from the memory 12c and transmits the electronic key ID "ID-12" and the SEED code "SEED-12AA" to the vehicle 1. The ECU registration unit 29 writes the electronic key ID "ID-12", which is acquired from the electronic key 2c, to the additional registration electronic key ID storage region of the memory 9.

In step S605, the ECU registration unit 29 generates the encryption code "K-12", which is related to the electronic key ID "ID-12", based on the SEED code "SEED-12AA", the ECU code "K-A", and the encryption algorithm 18b. Then, the ECU registration unit 29 writes the encryption code "K-12" to the memory 9. In this case, the ECU registration unit 29 inserts the ECU code "K-A" as an encryption code and the SEED code "SEED-12AA" as an encrypted text in the encryption algorithm 18b to compute the encryption code "K-12" as a plain text. The encryption code "K-12" is written to the additional registration encryption code storage region of the memory 9.

In step S606, the ECU registration unit 29 transmits a SEED code delete request to the electronic key 2c through LF band bidirectional near-field wireless communication. In response to the SEED code delete request, the key registration unit 31c deletes the SEED code "SEED-12AA" from the memory 12c.

The present embodiment has the advantages described below.

(1) In the electronic key registration system 15, the electronic key ID and the encryption code are stored in the verification ECU 4 to register the electronic key 2 to the verification ECU 4. Further, when the electronic key 2 is registered, the vehicle ID, which is unique to the vehicle 1, is associated with the electronic key ID together with the ECU ID, which is unique to the verification ECU 4 storing the electronic key ID and the encryption code. Thus, when registering a new electronic key 2 to the verification ECU 4, the key registration may be performed while checking the vehicle ID and the ECU ID that are associated with each other. This increases the level of security when registering the electronic key 2.

(2) When initially registering an electronic key 2 to the vehicle 1, factory registration is performed. When additionally registering an electronic key 2 to the vehicle, online registration is performed if network communication is available and offline registration is performed if network communication is not available. Thus, the electronic key 2 may be registered to the vehicle 1 under different situations in a manner that is optimal for each situation.

(3) When factory registration is performed, the verification ECU 4 reads the SEED code from the electronic key 2a and uses the SEED code in the encryption code generation logic 18a to generate the encryption code K-1. In this manner, during factory registration, the encryption code is not directly transferred between the verification ECU 4 and the electronic key 2a. Rather, the SEED code is transferred. This increases the level of security when writing the encryption code to the verification ECU 4.

(4) When factory registration is performed, the SEED code written to the electronic key 2a is deleted from the memory 12 after the key registration is completed. Since, the SEED code does not remain in the electronic key 2a, the encryption code cannot be stolen.

(5) During online registration and offline registration, the management center 17 computes the SEED code and transmits the SEED code to the verification ECU 4. The verification ECU 4 inserts the SEED code acquired from the management center 17 in the encryption algorithm 18b to generate the encryption code. In this manner, during online registration and offline registration, the encryption code is not directly transferred between the verification ECU 4 and the management center 17. Rather, the SEED code is transferred. This increases the level of security when writing the encryption code to the verification ECU 4.

It should be apparent to those skilled in the art that the present invention may be embodied in many other specific forms without departing from the spirit or scope of the invention. Particularly, it should be understood that the present invention may be embodied in the following forms.

In the above embodiment, the management center 17 includes the databases 24 to 27 for different functions. However, two or more of the databases 24 to 27 may be combined.

The communication performed between the vehicle 1 (verification ECU 4) and the electronic key 2 during key registration is not limited to wireless communication and may be wire-connected communication.

The notification of the electronic key ID to the management center 17 may be performed by, for example, the operator.

The encryption algorithms 18b and 28 may each use a non-AES computation equation.

The memory 9 of the verification ECU 4 does not have to separate the storage regions for the electronic key ID and the encryption code into a factory registration storage region and an additional registration storage region.

The registration tool 16 may be dedicated for key registration.

The registration tool 16 may be a personal computer that downloads, for example, a dedicated application.

The registration tool 16 may be, for example, integrally incorporated in the vehicle 1.

The operator verification may be omitted.

The SEED code does not have to be deleted during offline registration.

The vehicle ID does not have to be marked on the vehicle body and may be, for example, registered to a memory in the vehicle 1 (onboard device).

Operator verification may be performed during factory registration.

Key registration may be performed through at least one of factory registration, online registration, and offline registration.

The area-limited registration (initial registration of electronic key 2) does not have to be performed in the vehicle factory 38 and may be performed within any limited area. Further, online registration and offline registration do not have to be performed in the vehicle dealer 40 and may be performed at a different location.

Network communication does not have to be performed through an Internet communication network and may be performed through a different communication network, such as a telephone network.

The encryption code is not limited to challenge-response verification and may be used for other types of encrypted communication performed between the vehicle 1 (verification ECU 4) and the electronic key 2.

The encryption verification used to verify the electronic key 2 in the electronic key system 3 may be changed.

The communication between the vehicle 1 (verification ECU 4) and the registration tool 16 during key registration is not limited to wire-connected communication and may be wireless communication.

The encryption code computation equation is not limited to the encryption code generation logic 18a.

The electronic key system 3 is not limited to an immobilizer system and may be, for example, an operation-free key system, which verifies the electronic key 2 through narrowband communication when communication is established with the vehicle. Further, the electronic key system 3 may be a system other than the operation-free key system, and the communication frequency, communication protocol, and verification method may be changed.

The controller is not limited to the verification ECU 4 and may be changed to a different ECU.

The communication subject is not limited to the vehicle 1 and may be changed to a different apparatus or machine.

The electronic key registration system 15 may be used to delete registrations in addition to performing registrations.

The present examples and embodiments are to be considered as illustrative and not restrictive, and the invention is not to be limited to the details given herein, but may be modified within the scope and equivalence of the appended claims.

The invention claimed is:

1. A method for registering an electronic key to a controller of a vehicle, wherein the electronic key includes a unique electronic key ID and an encryption code associated with the electronic key ID and used for encrypted communication between the electronic key and the controller, the method comprising:
    performing an area-limited registration in which the electronic key is registered within a limited area;
    wherein the area-limited registration includes:
    reading a SEED code and the electronic key ID from the electronic key and writing the electronic key ID to a memory of the controller;
    inserting the SEED code in an encryption code computation equation to generate the encryption code with the controller and writing the encryption code to the memory of the controller;
    deleting the SEED code from the electronic key after writing the encryption code to the memory;
    invalidating a function for the area-limited registration in the controller;
    assigning a unique vehicle ID to the vehicle; and
    associating the vehicle ID, a controller ID, which is unique to the controller, and the electronic key ID with one another in a database of a management center.

2. The method according to claim 1, further comprising:
    performing at least either one of online registration and offline registration, wherein
        the online registration includes registering an additional electronic key to the controller based on the vehicle ID while communicating with the management center when network communication is available, and
        the offline registration includes registering an additional electronic key to the controller based on the vehicle ID without communicating with the management center.

3. A method for registering an electronic key to a controller of a vehicle, wherein the electronic key includes a unique electronic key ID and an encryption code associated with the electronic key ID and used for encrypted communication between the electronic key and the controller, the method comprising:
    performing an area-limited registration in which the electronic key is registered within a limited area,
    wherein the area-limited registration includes:
        storing the electronic key ID and the encryption code in the controller to register the electronic key to the controller, and
        associating a vehicle ID, which is unique to the vehicle, with a controller ID, which is unique to the controller storing the electronic key ID and the encryption code, and the electronic key ID; and
    performing at least either one of online registration and offline registration, wherein
        the online registration includes registering an additional electronic key to the controller based on the vehicle ID while communicating with a management center when network communication is available, and
        the offline registration includes registering an additional electronic key to the controller based on the vehicle ID without communicating with the management center,
    wherein the online registration includes:
    reading an additional electronic key ID from the additional electronic key and writing the additional electronic key ID to a memory of the controller,
    transmitting the vehicle ID of the vehicle that includes the controller, the controller ID of the controller, and the additional electronic key ID to the management center through the network communication,
    reading, in the management center, a controller code associated with the controller ID from a database of the management center based on the vehicle ID and the controller ID,
    reading, in the management center, an additional encryption code associated with the additional electronic key ID from the database based on the additional electronic key ID,
    inserting, in the management center, the controller code and the additional encryption code in an encryption algorithm to compute a SEED code,
    transmitting the SEED code from the management center to the controller through the network communication,
    inserting the SEED code and the controller code, which is stored beforehand in the controller, in the encryption algorithm to compute the additional encryption code with the controller and write the additional encryption code to the memory, and
    associating the vehicle ID, the controller ID, and the additional electronic key ID with one another in the database.

4. A method for registering an electronic key to a controller of a vehicle, wherein the electronic key includes a unique electronic key ID and an encryption code associated with the electronic key ID and used for encrypted communication between the electronic key and the controller, the method comprising:
    performing an area-limited registration in which the electronic key is registered within a limited area,
    wherein the area-limited registration includes:
        storing the electronic key ID and the encryption code in the controller to register the electronic key to the controller, and
        associating a vehicle ID, which is unique to the vehicle, with a controller ID, which is unique to the controller storing the electronic key ID and the encryption code, and the electronic key ID; and performing at least either one of online registration and offline registration, wherein
   the online registration includes registering an additional electronic key to the controller based on the vehicle ID while communicating with a management center when network communication is available, and
   the offline registration includes registering an additional electronic key to the controller based on the vehicle ID without communicating with the management center,
wherein the offline registration includes:
manufacturing the additional electronic key before performing the offline registration, wherein the manufacturing the additional electronic key includes
   locating the controller ID with the vehicle ID,
   acquiring a controller code associated with the controller ID,
   inserting the controller code and an additional encryption code in an encryption algorithm to compute a SEED code, and
   writing the SEED code and the additional encryption code to the additional electronic key;
reading an additional electronic key ID and the SEED code from the additional electronic key and writing the additional electronic key ID to a memory of the controller; and
inserting the SEED code and the controller code, which is stored beforehand in the controller, in the encryption algorithm to compute the additional encryption code with the controller and write the additional encryption code to the memory.

5. The method according to claim 1, further comprising manufacturing the controller before performing the area-limited registration,
   wherein the manufacturing the controller includes:
   associating the controller ID with a controller code, wherein the controller code is used by the controller to generate the encryption code, and
   storing the controller code and the controller ID in the database of the management center.

6. The method according to claim 1, further comprising manufacturing the electronic key before performing the area-limited registration,
   wherein the manufacturing the electronic key includes associating the electronic key ID with the encryption code and storing the electronic key ID and the encryption code in the database of the management center.

7. The method according to claim 3, further comprising manufacturing the additional electronic key before performing the online registration, wherein the manufacturing the additional electronic key includes associating the additional electronic key ID with the additional encryption code and storing the additional electronic key ID and the additional encryption code in the database of the management center.

8. The method according to claim 3, wherein the online registration includes verifying an operator, who wishes to register the additional electronic key to the controller, with an operator ID and a password.

9. The method according to claim 3, wherein the online registration includes:
   determining whether or not the electronic key has been registered to the controller, and
   registering the additional electronic key when the electronic key has been registered.

10. The method according to claim 4, wherein the offline registration includes:
   determining whether or not the electronic key has been registered to the controller, and
   registering the additional electronic key when first electronic key has been registered.

11. The method according to claim 4, wherein the offline registration includes, after manufacturing the additional electronic key, associating the additional electronic key ID and the additional encryption code with each other in the database of the management center and associating the vehicle ID, the controller ID, and the additional electronic key ID with one another in the database of the management center.

* * * * *